United States Patent [19]

Murakami et al.

[11] Patent Number: 5,502,114
[45] Date of Patent: Mar. 26, 1996

[54] TERMINAL-MODIFIED POLYOLEFINS

[75] Inventors: Naomi Murakami; Miyuki Usui; Hiroyuki Furuhashi; Satoshi Ueki, all of Saitama, Japan

[73] Assignee: Tonen Corporation, Tokyo, Japan

[21] Appl. No.: 137,075

[22] PCT Filed: Feb. 5, 1993

[86] PCT No.: PCT/JP93/00154

§ 371 Date: Mar. 16, 1994

§ 102(e) Date: Mar. 16, 1994

[87] PCT Pub. No.: WO93/16115

PCT Pub. Date: Aug. 19, 1993

[30] Foreign Application Priority Data

Feb. 10, 1992 [JP] Japan .................................. 4-023808
Feb. 10, 1992 [JP] Japan .................................. 4-023809
Feb. 10, 1992 [JP] Japan .................................. 4-023810

[51] Int. Cl.⁶ ........................... C08L 23/10; C08L 23/16; C08L 23/26
[52] U.S. Cl. ........................... 525/301; 525/305; 525/365
[58] Field of Search ........................... 525/305, 301, 525/365

[56] References Cited

U.S. PATENT DOCUMENTS 4,981,896  1/1991  Okada et al. ........................... 524/413
5,328,956  7/1994  Hasebe et al. ........................... 525/64

FOREIGN PATENT DOCUMENTS

| 0188915 | 7/1986 | European Pat. Off. . |
| 0234114 | 9/1987 | European Pat. Off. . |
| 0441548 | 8/1991 | European Pat. Off. . |
| 0529102 | 3/1993 | European Pat. Off. . |
| 4137215 | 5/1992 | Germany . |
| WO92/16566 | 10/1992 | WIPO . |

OTHER PUBLICATIONS

Aijima et al., "*Modified Polyolefin Composites*", Chemical Abstracts, vol. 75, No. 26, Abstract No. 152609s (Dec. 27, 1971).

*Primary Examiner*—W. Robinson H. Clark
*Attorney, Agent, or Firm*—Wenderoth, Lind & Ponack

[57] ABSTRACT

The present invention provides a linear polyolefin wherein one of the terminals of linear polypropylene or linear ethylene-propylene random copolymer is modified with a (meth)acrylic derivative unit or styrene derivative unit to give a substantially monodipersed system. The feature thereof consists in such a linear polyolefin in which the terminal of linear polypropylene or linear ethylene-propylene random copolymer obtained by living polymerization is modified with a (meth)acrylic derivative unit or styrene derivative unit. For the production thereof, there are used methacrylic acid chloride, acrylic acid chloride, ethylene glycol dimethacrylate, etc. as the (meth)acrylic derivative, and divinylbenzene, etc. as the styrene derivative.

3 Claims, No Drawings

TERMINAL-MODIFIED POLYOLEFINS

FIELD OF THE INVENTION

This invention relates to polyolefins whose terminals are modified with (meth)acrylic acid derivative units or styrene derivative units.

BACKGROUND OF THE INVENTION

In the polymerization of α-olefins such as propylene, etc. by the Ziegler Natta catalyst of the prior art, a chain-transfer reaction or chain termination reaction takes place and accordingly, it is difficult to modify one of the terminals of the polymer with substituents, etc.

The object of the present invention is to provide such a linear polyolefin wherein one of the terminals of polypropylene or ethylene-propylene random copolymer is modified with methacrylic acid (acrylic acid) derivative units or styrene derivative units to give a substantially monodispersed system.

SUMMARY OF THE INVENTION

The inventors have made various studies to achieve the object and consequently, have found that the object of the present invention can be achieved by reacting a living polypropylene or ethylene-propylene random copolymer obtained using a specified catalyst accompanying no chain-transfer reaction nor chain termination reaction, with a methacrylic acid (acrylic acid) derivative or styrene derivative.

DETAILED DESCRIPTION OF THE INVENTION

Accordingly, the present invention provides such a terminal-modified linear polyolefin wherein one of the terminals of polypropylene or ethylene-propylene random copolymer is modified with a substituent represented by the following General Formula I:

General Formula I

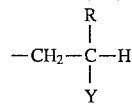

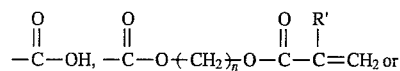

R' is a hydrogen atom or methyl group, X is a substituent having no active hydrogen atom and excluding saturated hydrocarbon groups and n is an integer of 2 to 4.

The terminal-modified linear polyolefin of the present invention is ordinarily obtained in the form of such a composition that one of the terminals is represented by the following General Formula II, General Formula II

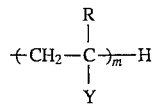

wherein R and Y have the same meaning as described above and m is a numeral of 0.1 to 100.

The terminal-modified linear polyolefin of the present invention can be prepared by polymerizing propylene or random-copolymerizing ethylene and propylene in the presence of a catalyst consisting essentially of an organoaluminum compound and a vanadium compound represented by the following General Formula III,

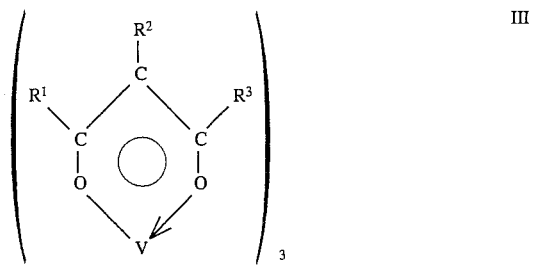

wherein $R^1$ to $R^3$ are hydrogen atoms or hydrocarbon groups of 1 to 8 carbon atoms and at least one of $R^1$ to $R^3$ must be a hydrogen atom, but all of R' to $R^3$ must not be hydrogen atoms, thus obtaining respectively living linear polypropylene or living linear ethylene-propylene random-copolymer, and then reacting the living polypropylene or living ethylene-propylene random-copolymer with a methacrylic acid (acrylic acid) derivative or a styrene derivative represented by the following General Formula IV,

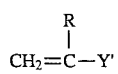

wherein R has the same meaning as described above, Y' is

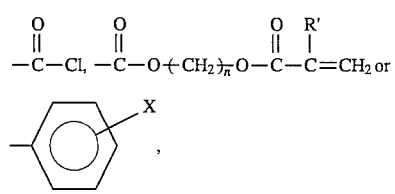

and R', X and n have the same meaning as described above. When Y' is

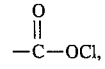

following the above described reaction, the reaction product is reacted with an aqueous solution of NaOH to synthesize a terminal-modified polyolefin having sodium (metha)acrylate at the terminal thereof and the terminal of sodium (metha)acrylate is contacted with a proton $$-\overset{\overset{\displaystyle O}{\|}}{C}-OH.$$

CATALYST (a) Vanadium Compound

The vanadium compound used in the present invention is represented by the following General Formula III,

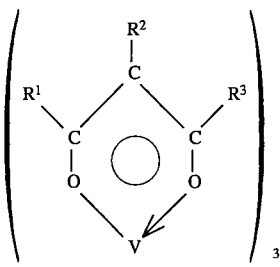

wherein $R^1$ to $R^3$ have the same meanings as described above.

Specific examples of the compound included in the above described general formula will now be illustrated.

Case where $R^2$ is a hydrogen atom and $R^1$ and $R^3$ are hydrocarbon groups: $R^1/R^3$: $CH_3/CH_3$, $CH_3/C_2H_5$, $C_2H_5/C_2H_5$, $CH_3/C_6H_5$, $C_2H_5/C_6H_5$, $C_6H_5/C_6H_5$, $CH_3/C_6H_5$, $CH_2$, $C_6H_5$ $CH_2/C_6H_5CH_2$, $C_2H_5/C_6H_5CH_2$, $C_6H_5/C_6H_5$, $CH_2$ Case where $R^2$ is a hydrocarbon group and one of $R^1$ and $R^3$ is a hydrogen atom and the other is a hydrocarbon group:

$R^2/R^1$ or $R^3$:$CH_3/CH_3$, $C_2H_5/CH_3$, $CH_3/C_2H_5$, $C_2H_5/C_2H_5$, $C_2H_5/CH_3$, $CH_3/C_6H_5$, $C_6H_5/C_2H_5$, $C_2H_5/C_6H_5$, $C_6H_5/C_6H_5$, $C_6H_5CH_2/CH_3$, $CH_3/C_6H_5CH_2$, $C_6H_5CH_2/C_6H_5CH_2$, $C_6H_5CH_2/C_2H_5$, $C_2H_5/C_6H_5CH_2$, $C_6H_5CH_2H_5/C_6H_5$, $C_6H_5/C_6H_5CH_2$

Case where $R^2$ is a hydrogen atom and one of $R^1$ and $R^3$ is a hydrogen atom and the other is a hydrocarbon group:

$R^1$ or $R^3$:$CH_3$, $C_2H_5$, $C_6H_5$, $C_6H_5CH_2$

Above all, the following compounds are preferable.

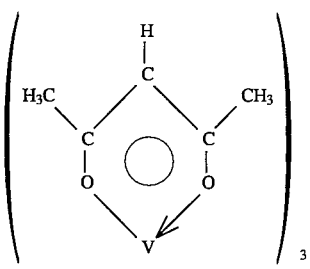

V(acetylacetonato)₃

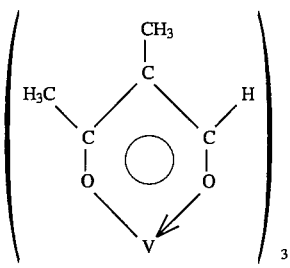

V(2-methyl-1,3-butanedionato)₃

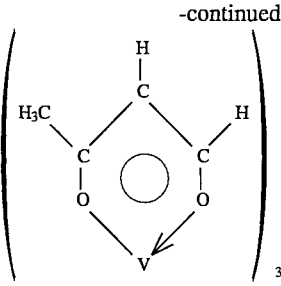

V(1,3-butanedionato)₃

(b) Organoaluminum Compound

As the organoaluminum compound, there are used those represented by the general formula $R^4{}_n \cdot AlX'_{3-n}$ wherein $R^4$ is an alkyl or aryl group, X is a halogen atom or hydrogen atom and n is any numeral in the range of $1 \leq n < 3$, for example, alkylaluminum compounds containing 1 to 18 carbon atoms, preferably 2 to 6 carbon atoms, such as dialkylaluminum monohalide, monoalkylaluminum dihalide and alkylaluminum sesquihalide, mixtures or complex compounds thereof. Specifically, there are dialkylaluminum monohalides such as dimethylaluminum chloride, diethylaluminum chloride, diethylaluminum bromide, diethylaluminum iodide, diisobutylaluminum chloride, etc., monoalkyl aluminum dihalides such as methylaluminum dichloride, ethylaluminum dichloride, methylaluminum dibromide, ethylaluminum dibromide, ethylaluminum diiodide, isobutylaluminum dichloride, etc., alkylaluminum sesquihalides such as ethylaluminum sesquichloride, etc.

The proportion of the vanadium compound and organoaluminum compound used is generally 1 to 1,000 moles of the organoaluminum compound per 1 mole of the vanadium compound.

LIVING POLYMERIZATION OF PROPYLENE

The living polymerization of propylene includes homopolymerization of propylene and copolymerization of propylene with a small amount of ethylene or α-olefins such as 1-butene, 1-hexene, 4-methyl-1-pentene and the like.

The polymerization reaction is preferably carried out in a solvent inert to the polymerization reaction and liquid during the polymerization, for example, saturated aliphatic hydrocarbons such as propane, butane, pentane, hexane, heptane, etc., saturated alicyclic hydrocarbons such as cyclopropane, cyclohexane, etc. and aromatic hydrocarbons such as benzene, toluene, xylene, etc.

The amount of a polymerization catalyst used in the polymerization of propylene is, per 1 mole of propylene or propylene with a small amount of a comonomer, $1 \times 10^{-4}$ to 0.1 mole, preferably $5 \times 10^{-4}$ to $5 \times 10^{-2}$ mole of a vanadium compound and $1 \times 10^{-4}$ to 0.5 mole, preferably $5 \times 10^{-3}$ to 0.1 mole of an organoaluminum compound. The organoaluminum compound is preferably used in a proportion of 4 to 100 moles to 1 mole of the vanadium compound.

The living polymerization is generally carried out at $-100°$ C. to $+100°$ C. for 0.5 to 50 hours.

The molecular weight and yield of the resulting living polypropylene can be controlled by changing the reaction temperature and reaction time. When the polymerization temperature is adjusted to a low temperature, in particular, at most $-30°$ C. , there can be obtained a polymer with a substantially monodispersed molecular weight distribution. At a temperature of at most $-50°$ C., there can be obtained a living polymer with an Mw (weight average molecular weight)/Mn (number average molecular weight) ratio of 1.05 to 1.40.

In the polymerization reaction, a reaction accelerator can be used. As the reaction accelerator, there are used anisole, water, oxygen, alcohols such as methanol, ethanol, isopropanol and the like, esters such as ethyl benzoate, ethyl acetate, etc. The amount of the accelerator used is ordinarily 0.1 to 2 moles per 1 mole of the vanadium compound.

In this way, a living linear polypropylene having a number average molecular weight of about 800 to 400,000 and a substantially monodispersed system can be produced.

LIVING RANDOM COPOLYMERIZATION OF ETHYLENE-PROPYLENE

The living random copolymerization of ethylene-propylene can be carried out in the similar manner to the above described living polymerization of propylene simultaneously using propylene and ethylene.

The ratio of ethylene and propylene in the living copolymer is ordinarily up to 90 mole % of ethylene. This can be controlled by changing the ratio of ethylene and propylene used in the living polymerization, but if the amount of ethylene used is increased, the molecular weight distribution of the copolymer is broadened, which is not preferable. When it is desired to produce a living copolymer with a higher ethylene content and a narrower molecular weight distribution, i.e. near monodisperse, a very small amount of propylene is added to the polymerization system before the living copolymerization of ethylene and propylene and maintained for 0.1 to 1 hour, whereby a larger amount of ethylene can be introduced into the copolymer while maintaining a narrow molecular weight distribution of the living copolymer.

In this way, a living linear ethylene-polypropylene random copolymer having a number average molecular weight (in terms of propylene, to be repeated in the following) of about 500 to 500,000 and a substantially monodispersed system can be produced.

REACTION WITH METHACRYLIC ACID (ACRYLIC ACID) DERIVATIVE OR STYRENE DERIVATIVE

A methacrylic acid (acrylic acid) derivative or styrene derivative (which will hereinafter be referred to as Compound I) to be reacted with a living polypropylene or ethylene-propylene random copolymer is represented by the following General Formula IV, $$CH_2=C-Y' \quad \text{IV}$$
$$\phantom{CH_2=C-Y'}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\overset{\displaystyle R}{\vert}$$

wherein R and Y' have the same meanings as described above. Specifically, the methacrylic acid (acrylic acid) derivative or styrene derivative is as follows:

(a) Case where Y' is 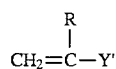

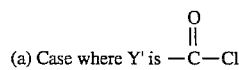

wherein R has the same meaning as described above.

(b) Case where Y' is 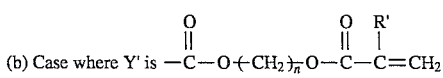

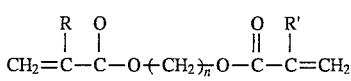 VI in which R, R' and n have the same meanings as described above.

(c) Case where Y' is 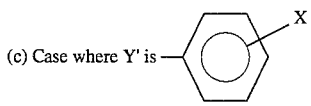

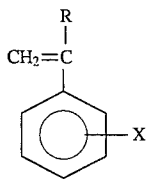 VII in which R and X have the same meanings as described above.

Examples of the substituent as X include halogens such as —Cl, —Br, etc., haloalkyl groups such as —CH$_2$Cl, —CH$_2$CH$_2$Br, etc., alkoxy groups such as —OMe, —OPr, etc., alkoxyalkyl groups such as —CH$_2$OC$_2$H$_5$, etc., N,N-dialkylamino groups such as —N(CH$_3$)$_2$, etc., N,N-dialkylaminoalkyl groups such as —CH$_2$N(CH$_3$)$_2$, etc., carboxylic acid esters such as —COOCH$_3$, —COOC$_2$, H$_5$etc., alkenyl groups such as vinyl group, —CH$_2$—CH=CH$_2$, etc., trialkylsiloxy groups such as —OSi(CH$_3$)$_3$, etc., trialkylsiloxyalkyl groups such as —CH$_2$OSi(CH$_3$)$_3$, N,N,N-trialkylsilylamino groups such as —N[Si(CH$_3$)$_3$], etc., N,N,N-trialkylsilylaminoalkyl groups such as —CH$_2$N[Si(CH$_3$)$_3$]$^3$, etc., trialkylsilyl groups such as —Si(CH$_3$)$_3$, etc., trialkylsilylalkyl groups such as —CH$_2$Si(CH$_3$)$_3$, trialkoxysilyl groups such as —Si(OCH$_3$)$_3$ and trialkoxysilylalkyl groups such as —CH$_2$Si(OCH$_3$)$_3$, etc.

The reaction of a living polypropylene or ethylene-propylene random copolymer with Compound I is preferably carried out by feeding Compound I to a reaction system in which the living polypropylene or ethylene-propylene random copolymer is present. The reaction is carried out at a temperature of −100° C. to +150° for 5 minutes to 50 hours. The modification efficiency of the terminal of a polyolefin with Compound I unit can be increased by raising the reaction temperature or lengthening the reaction time.

Compound I is generally used in a proportion of 1 to 1,000 moles to 1 mole of a living polyolefin.

The reaction product of a living polypropylene or ethylene-propylene random copolymer with Compound I is then brought into contact with a proton donor to obtain a terminal-modified polyolefin according to the present invention. As the proton donor, there are used alcohols such as methanol, ethanol, phenol and the like, and mineral acids such as hydrochloric acid, sulfuric acid and the like. The alcohol and mineral acid can simultaneously be used. Generally, the proton donor is used in a largely excessive quantity. Contacting with the proton donor is generally carried out at −100° to +150° C. for 1 minute to 50 hours, preferably at −100° C. to +100° C. for 1 minute to 10 hours.

When using the foregoing (meth)acrylic acid derivative of General Formula V [the foregoing case (a)], the reaction product of the living polypropylene or ethylene-propylene random copolymer with Compound I is contacted with a proton donor through a reaction with a NaOH solution, thus obtaining the terminal-modified polyolefin of the present invention.

As the proton donor, there are used alcohols such as methanol, ethanol, phenol and the like, and mineral acids such as hydrochloric acid, sulfuric acid and the like. The alcohol and mineral acid can simultaneously be used. Generally, the proton donor is used in a largely excessive quantity. Contacting with the proton donor is generally carried out at −100° C. to +100° C. for 1 minute to 10 hours.

The linear polyolefin of the present invention, obtained in this way, has a number average molecular weight (Mn) of about 800 to 400,000 and a very narrow molecular weight distribution (Mw/Mn =1.05 to 1.40) corresponding to the foregoing living polypropylene or ethylene-propylene random copolymer itself, one of whose terminals is modified with 0.'to 100 units, preferably 0.2 to 50 units, more preferably 0.3 to 25 units of the foregoing Compound I.

One of the features of the terminal-modified linear polypropylene according to the present invention consists in that the syndiotactic dyad fraction is at least 0.6.

EXAMPLES

The present invention will be illustrated by the following examples, in which characterization of the polymers was carried out by the following methods:

Molecular Weight and Molecular Weight Distribution

GPC (gel permeation chromatography) Model 150 (commercial name, made by Waters Co.) was used. Solvent: o-dichlorobenzene; Measuring Temperature: 135° C. ; Solvent Flow Rate: 1.0 ml/min; Column: GMH 6HT (commercial name, made by Toso KK). For the measurement, a standard sample of a monodispersed polystyrene made by Toso KK was used and a calibration curve of polystyrene was sought, from which a calibration curve of polypropylene was prepared by the universal method.

Determination of Structure of Polymer ($^1$H-NMR Spectrum): Measurement was carried out using a NMR spectrometer of Fourier transformation type, GSX-400 (commercial name, made by Nippon Denshi KK) at 400 MHz, 30° C. and a pulse interval of 15 seconds. A sample was dissolved in dichloroform and prepared.

($^{13}$C-NMR Spectrum): Measurement was carried out using a NMR spectrometer of XL-200 type (commercial name, made by Variant Co.) equipped with a PFT (Pulse Fourier Transformation) means at 50 MHz, 120° C., a pulse width of 8.2 µs π/3, a pulse interval of 4 seconds and an integrating number of 5,000. A sample was dissolved in a mixed solvent of trichlorobenzene and benzene (2:1) and prepared.

(Infrared Absorption Spectrum)

A polymer was cast on a plate of KBr and subjected to measurement using an infrared spectro photometer, Model IR-810 (commercial name, made by Nippon Bunko Kogyo KK).

EXAMPLE 1

100 ml of n-heptane was charged in a flask of 300 ml, sufficiently replaced by nitrogen gas, and then cooled at −60° C., to which 200 millimoles of propylene was added at the same temperature, followed by dissolving in the n-heptane. A solution of 15 millimoles of Al(C$_2$H$_5$)$_2$Cl in n-heptane and a solution of 1.5 millimole of V(2-methyl-1,3-butanedionato)$_3$ in toluene were then added thereto and stirred to start polymerization. The polymerization of propylene was carried out at −60° C. for 1 hour.

100 millimoles of methacrylic chloride (MACl) was added to the above described reaction system at the same temperature and reacted for 1 hour.

Then, the reaction solution was poured in 500 ml of acetone to which 10 ml of a 20 weight % aqueous NaOH solution had been added to precipitate a polymer. The resulting polymer was again dissolved in n-heptane and subjected to centrifugal separation to obtain a supernatant, which was then poured in 500 ml of acetone to again precipitate a polymer. The resulting polymer was sujected to IR analysis to find an absorption due to COO −(carboxylic acid anion) at 1570cm$^{-1}$.

Then, this polymer was dissolved in THF, to which HCl was added to a pH of at most 7 with agitation. This solution was poured in 500 ml of acetone to precipitate a polymer, washed five times with acetone and dried at room temperature to obtain 1.10 g of a polymer.

The resulting polymer exhibited a GPC curve with a single peak and had an Mn of 3.7×10$^3$ and Mw/Mn of 1.19, near monodisperse.

When this polymer was subjected to measurement of the infrared absorption spectrum (IR), there were found an absorption due to carbonyl group of —COOH at 1705 cm$^{-1}$. Moreover, when analysis of $^1$H-NMR was carried out, a peak of the following chemical shift value was observed in addition to a peak (a δ=0.7 ~1.7 ppm) due to the polypropylene:

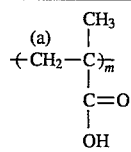

| Assignment | Chemical Shift Value (ppm: TMS Standard) |
|---|---|
| (a) | 1.9 |

Furthermore, from the results of $^{13}$C-NMR analysis, a peak due to carbon of COOH group was observed at 185 ppm. These results show that methacrylic acid unit was bonded to the terminal of polypropylene. In addition, it was found from the area ratio of the carbon signal of the polypropylene moiety and the carbon signal of COOH group of the methacrylic acid unit that the resulting polymer had six methacrylic acid units incorporated at the terminals of polypropylene chain.

EXAMPLE 2

400 ml of n-heptane was charged in an autoclave of 1500 ml, sufficiently replaced by nitrogen gas, and then cooled at −60° C., to which 200 g of propylene was added at the same temperature, followed by liquefying and dissolving in the n-heptane. A solution of 50 millimoles of Al(C$_2$H$_5$)$_2$Cl in n-heptane and and a solution of 0.6 millimole of V(2-methyl-1,3-butanedionato)$_3$in toluene were then added thereto and stirred to start polymerization. The polymerization was continued for 15 hours.

500 millimoles of MACl was added to the above described reaction system at the same temperature, the temperature of the reaction system was raised to −40° C. in 1 hour and the reaction with MACl was carried out at −40° C. for 5 hours, followed by treating in an analogous manner to Example 1 to obtain a terminal-modified polypropylene having the properties shown Table 1.

EXAMPLE 3

100 ml of toluene was charged in a flask of 300 ml, sufficiently replaced by nitrogen gas, and then cooled at −78° C., to which 200 millimoles of propylene was added at the same temperature, followed by liquefying and dissolving in the toluene. A solution of 15 millimoles of $Al(C_2H_5)_2Cl$ in n-heptane and a solution of 1.5 millimole of V(acetylacetonato)$_3$ in toluene were then added thereto and stirred to start polymerization. The polymerization of propylene was carried out at −78° C. for 3 hours.

Then, the reaction with MACl was carried out in an analogous manner to Example 1 to obtain a terminal-modified polypropylene having the properties shown in Table 1, except adjusting the reaction conditions to 0° C. and 3 hours.

EXAMPLE 4

Example 1 was repeated except using acrylic chloride in place of MACl to obtain a terminal-modified polypropylene having the properties shown in Table 1.

When this polymer was subjected to measurement of IR, there were found an absorption due to carbonyl group of —COOH at 1705 cm$^{-1}$. Moreover, when analysis of NMR was carried out, a peak of the following chemical shift value was observed in addition to a peak ($\delta$=0.7 ~1.7 ppm) due to the polypropylene:

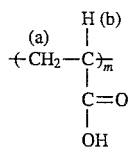

of the acrylic acid unit that the resulting polymer had three acrylic acid units incorporated at the terminals of polypropylene chain.

EXAMPLE 5

500 ml of toluene was charged in an autoclave of 1000 ml, sufficiently replaced by nitrogen gas, and then cooled at −60° C., to which a solution of 25 millimoles of $Al(C_2H_5)_2Cl$ in n-heptane and a solution of 1.5 millimole of V(2-methyl-1,3-butanedionato)$_3$ in toluene were then added at the same temperature. After evacuating the system to 680 mmHg, a mixed gas of ethylene and propylene (40/60 mole ratio) was continuously fed thereto and copolymerization of ethylene-propylene was effected at −60° C. for 2 hours.

500 millimoles of MACl was then added thereto at −60° C. and reacted for 2 hours, followed by treating in an analogous manner to Example 1 to obtain a terminal-modified ethylene-propylene random copolymer having the properties shown Table 1.

This copolymer was subjected to $^{13}$C-NMR measurement and a propylene content was calculated from areas of a peak (S) assigned to secondary carbon and a peak (T) assigned to tertiary carbon, based on the following formula. Consquently, the propylene content of the copolymer was 51.6 mole %.

Propylene Content (mole %)={T/½(S+T)}×100

When this copolymer was subjected to thermal analysis by a differential scanning calorimeter (DSC), a glass transition temperature (about −10° C.) due to propylene homopolymer was not observed.

TABLE 1

| | Polymerization Conditions of Polyolefin | | Reaction Conditions of Compound I | | Terminal-modified Polyolefin | | | m Value in |
|---|---|---|---|---|---|---|---|---|
| Examples | Temp. (°C.) | Time (Hr) | Temp. (°C.) | Time (Hr) | Yield (g) | Mn (×10$^3$) | Mw/Mn | General Formula |
| 1 | −60 | 1 | −60 | 1 | 1.10 | 3.7 | 1.19 | 6 |
| 2 | −60 | 15 | −40 | 5 | 42.9 | 105.1 | 1.28 | 14 |
| 3 | −78 | 3 | 0 | 3 | 0.95 | 5.7 | 1.17 | 3 |
| 4 | −60 | 1 | −60 | 1 | 1.04 | 3.6 | 1.20 | 3 |
| 5 | −60 | 2 | −60 | 2 | 4.37 | 13.2 | 1.25 | 1 |

-continued

| Assignment | Chemical Shift Value (ppm: TMS Standard) |
|---|---|
| (a) | 1.8 |
| (b) | 2.4 |

Furthermore, from the results of $^{13}$C-NMR analysis, a peak due to carbon of COOH group was observed at 175 ppm. These results show that acrylic acid unit was bonded to the terminal of polypropylene. In addition, it was confirmed from the area ratio of the carbon signal of the polypropylene moiety and the carbon signal of COOH group

EXAMPLE 6

100 ml of toluene was charged in a flask of 300 ml, sufficiently replaced by nitrogen gas, and then cooled to −60° C., to which 200 millimoles of propylene was added at the same temperature, followed by liquefying and dissolving in the toluene. A solution of 15 millimoles of $Al(C_2H_5)_2Cl$ in n-heptane and a solution of 1.5 millimole of V(2-methyl-1,3-butanedionato)$_3$ in toluene were then added thereto and stirred to start polymerization. The polymerization of propylene was carried out at −60° C. for 1 hour.

100 millimoles of ethylene glycol dimethacrylate (EGMA) was then added to the above described reaction system and reacted for 1 hour at the same temperature.

Then, the reaction solution was poured in 500 ml of methanol to precipitate a polymer, washed five times with methanol and dried at room temperature and reduced pressure to obtain 1.35 g of a polymer.

The resulting polymer exhibited a GPC curve with a single peak and had an Mn of $4.0 \times 10^3$ and Mw/Mn of 1.10, near monodisperse.

When this polymer was subjected to measurement of the infrared absorption spectrum (IR), there was found a peak based on absorption of carbonyl group of —COOH at 1740 cm$^{-1}$. Moreover, when analysis of NMR was carried out, a peak of the following chemical shift value was observed in addition to a peak ($\delta$=0.7 ~1.7 ppm) due to the polypropylene and it was found the terminal of the polypropylene chain.

$$\begin{array}{c} CH_3 \\ | \\ +CH_2-C)_mH \text{ (a)} \\ | \\ C=O \\ | \quad \text{(b)} \\ O-CH_2CH_2O \\ \text{(b)} \quad | \\ \quad C=O \\ \quad | \\ \quad C=CH_2 \text{ (d)} \\ \quad | \\ \quad CH_3 \\ \quad \text{(c)} \end{array}$$

| Assignment | Chemical Shift Value (ppm: TMS Standard) |
|---|---|
| (a) | 2.6 |
| (b) | 4.3 |
| (c) | 1.9 |
| (b) | 5.6, 6.1 |

In addition, it was found from the area ratio of the proton signal ($\delta$=0.7 ~1.7 ppm) of the polypropylene moiety and the proton signal (d) of EGMA unit that the resulting polymer had one EGMA unit bonded to the terminal of polypropylene chain.

EXAMPLE 7

400 ml of toluene was charged in an autoclave of 1500 ml, sufficiently replaced by nitrogen gas, and then cooled to −60° C., to which 200 g of propylene was added at the same temperature, followed by liquefying and dissolving in the toluene. A solution of 50 millimoles of Al(C$_2$H$_5$)$_2$Cl in n-heptane and and a solution of 0.6 millimole of V(2-methyl-1,3-butanedionato)$_3$ in toluene were then added thereto and stirred to start the polymerization, which was then continued for 5 hours.

500 millimoles of EGMA was then added to the above described reaction system at the same temperature, the temperature of the reaction system was raised to 0° C. for 1 hour and the reaction with EGMA was carried out at 0° C. for 5 hours, followed by treating in an analogous manner to Example 6 to obtain a terminal-modified polypropylene having the properties shown Table 2.

EXAMPLE 8

100 ml of toluene was charged in a flask of 300 ml, sufficiently replaced by nitrogen gas, and then cooled to −78° C., to which 200 millimoles of propylene was added at the same temperature, followed by liquefying and dissolving in the toluene. A solution of 15 millimoles of Al(C$_2$H$_5$)$_2$Cl in n-heptane and a solution of 1.5 millimole of V(acetylacetonato)$_3$ in toluene were then added thereto and stirred to start polymerization. The polymerization of propylene was carried out at −78° C. for 3 hour.

The reaction with EGMA was carried out in an analogous manner to Example 6 except adjusting the reaction conditions to −40° C. and 3 hours, thus obtaining a terminal-modified polypropylene having the properties shown Table 2.

EXAMPLE 9

500 ml of toluene was charged in an autoclave of 1000 ml, sufficiently replaced by nitrogen gas, and then cooled to −60° C., to which a solution of 25 millimoles of Al(C$_2$H$_5$)$_2$Cl in n-heptane and a solution of 1.5 millimole of V(2-methyl- 1,3-butanedionato)$_3$ in toluene were then added at same temperature. After evacuating the system to 680 mmHg, a mixed gas of ethylene and propylene (40/60 mole ratio) was continuously fed thereto and copolymerization of ethyl- ene-propylene was effected at −60° C. for 4 hours.

500 millimoles of EGMA was then added thereto at the same temperature, the temperature of the reaction system was raised to −20° for 1 hour and reacted for 1 hour at the same temperature, followed by treating in an analogous manner to Example 6 to obtain a terminal-modified ethylene-propylene random copolymer having the properties shown Table 2.

The resulting copolymer was subjected to $^{13}$C-NMR measurement and a propylene content was calculated from areas of a peak (S) assigned to secondary carbon and a peak (T) assigned to tertiary carbon, based on the following formula. Consquently, the propylene content of the copolymer was 54.7 mole %.

Propylene Content (mole %) ={T/½(S+T)}×100

When this copolymer was subjected to thermal analysis by a differential scanning calorimeter (DSC), a glass transition temperature (about −10° C.) due to propylene homopolymer was not observed.

TABLE 2

| | Polymerization Conditions of Polyolefin | | Reaction Conditions of Compound I | | Terminal-modified Polyolefin | | | |
|---|---|---|---|---|---|---|---|---|
| Examples | Temp. (°C.) | Time (Hr) | Temp. (°C.) | Time (Hr) | Yield (g) | Mn (×10$^3$) | Mw/Mn | m Value in General Formula |
| 6 | −60 | 1 | −60 | 1 | 1.35 | 4.0 | 1.10 | 1 |
| 7 | −60 | 5 | 0 | 5 | 27.3 | 51.3 | 1.24 | 10 |
| 8 | −78 | 3 | −40 | 3 | 1.09 | 5.5 | 1.13 | 3 |

TABLE 2-continued

| | Polymerization Conditions of Polyolefin | | Reaction Conditions of Compound I | | Terminal-modified Polyolefin | | | |
|---|---|---|---|---|---|---|---|---|
| Examples | Temp. (°C.) | Time (Hr) | Temp. (°C.) | Time (Hr) | Yield (g) | Mn (×10³) | Mw/Mn | m Value in General Formula |
| 9 | −60 | 4 | −20 | 1 | 9.15 | 27.7 | 1.25 | 4 |

EXAMPLE 10

Polymerization of propylene was carried out in an analogous manner to Example 1 and 100 millimoles of divinylbenzene was added thereto at −60° C., followed by reacting at the same temperature for 1 hour. Thereafter, the reaction solution was added to 500 ml of methanol to precipitate a polymer. The resulting polymer was washed with methanol five times and dried at room temperature and reduced pressure to obtain 2.14 g of a polymer.

The resulting polymer exhibited a GPC curve with a single peak and had an Mn of $5.9 \times 10^3$ and Mw/Mn of 1.30, near monodisperse.

On the other hand, in order to determine the molecular weight and molecular weight distribution of the polypropylene moiety, polymerization of propylene was carried out in the same manner as described above, thus obtaining 1.07 g of polypropylene with an Mn of $4.0 \times 10^3$ and Mw/Mn ratio of 1.25.

As a result of NMR analysis of the resulting polymer, a peak of the following chemical shift value was observed in addition to a peak ($\delta$=0.7~1.7 ppm) due to the polypropylene.

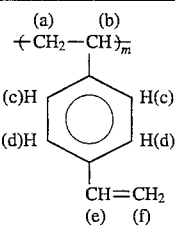

| Assignment | Chemical Shift Value (ppm: TMS Standard) |
|---|---|
| (a) | 1.5 |
| g(b) | 1.9 |
| (c), (e) | 6.3–6.8 |
| (d) | 6.7–7.3 |
| (f) | 5.2, 5.6 |

It was confirmed from the area ratio of the proton signal ($\delta$=0.7~1.7 ppm) of the polypropylene moiety and the proton signal (a) of the divinylbenzene unit, and from the molecular weight of the polypropylene that the polymer had fifty-six divinylbenzene units incorporated at the terminal of polypropylene chain.

EXAMPLE 11

In an analogous manner to Example 2, propylene was polymerized, 500 millimoles of divinylbenzene was when added thereto at the same temperature and the temperature of the reaction system was then raised to 0° C. for 1 hour, followed by effecting the reaction with divinylbenzene at 0° C. for further 5 hours. Subsequently, the procedure of Example 10 was carried out to obtain a terminal-modified polypropylene having the properties shown Table 3.

EXAMPLE 12

Propylene was polymerized in an analogous manner to Example 3 and the reaction with divinylbenzene was then carried out in an analogous manner to Example 10 except that the reaction conditions were adjusted to a temperature of −60° C. and a time of 3 hours, thus obtaining a terminal-modified polypropylene having the properties shown in Table 3.

EXAMPLE 13

500 ml of toluene was charged in an autoclave of 1000 ml, sufficiently replaced by nitrogen gas, and then cooled to −60° C., to which a solution of 25 millimoles of $Al(C_2H_5)_2Cl$ in n-heptane and a solution of 1.5 millimole of V(2-methyl- 1,3-butanedionato)$_3$ in toluene were then added at the same temperature. After evacuating the system to 680 mmHg, a mixed gas of ethylene and propylene (40/60 mole ratio) was continuously fed thereto and copolymerization of ethylene-propylene was effected at −60° C. for 4 hours.

500 millimoles of divinylbenzene was then added thereto at −60° C., the temperature of the reaction system was raised to −40° C. for 1 hour and reacted for 1 hour at the same temperature, followed by treating in an analogous manner to Example 10 to obtain a terminal-modified ethylene-propylene random copolymer having the properties shown Table 3.

On the other hand, in order to determine the molecular weight, molecular weight distribution and propylene content of the ethylene-propylene random copolymer moiety, copolymerization of ethylene and propylene was carried out in the same manner as described above, thus obtaining 9.24 g of ethylene-propylene random copolymer with an Mn of $28.5 \times 10^3$ and Mw/Mn ratio of 1.24.

Furthermore, the resulting copolymer was subjected to $^{13}$C-NMR measurement and a propylene content was calculated from areas of a peak (S) assigned to secondary carbon and a peak (T) assigned to tertiary carbon, based on the following formula. Consquently, the propylene content of the copolymer was 53.8 mole %.

Propylene Content (mole %)={T/½(S+T)}×100

When this copolymer was subjected to thermal analysis by a differential scanning calorimeter (DSC), a glass transition temperature (about −10° C.) due to propylene homopolymer was not observed.

TABLE 1

| | Polymerization Conditions of Polyolefin | | Reaction Conditions of Compound I | | Terminal-modified Polyolefin | | | |
|---|---|---|---|---|---|---|---|---|
| Examples | Temp. (°C.) | Time (Hr) | Temp. (°C.) | Time (Hr) | Yield (g) | Mn (×10³) | Mw/Mn | m Value in General Formula |
| 10 | −60 | 1 | −60 | 1 | 2.14 | 5.9 | 1.30 | 56 |
| 11 | −60 | 15 | 0 | 5 | 40.3 | 109.7 | 1.34 | 72 |
| 12 | −78 | 3 | −60 | 3 | 1.20 | 6.1 | 1.28 | 13 |
| 13 | −60 | 4 | −40 | 1 | 10.6 | 29.4 | 1.27 | 18 |

UTILITY AND POSSIBILITY ON COMMERCIAL SCALE

The polymer of the present invention is available for a compatibilizer of different polymers, a polymer modifier capable of imparting dyeing property or adhesiveness to polymers, a viscosity index-improver such as lubricating oils, etc.

We claim:

1. A process for the production of a terminal-modified linear chain polyolefin in which the polyolefin is polypropylene or ethylene-propylene random copolymer, one of the terminals of the polyolefin has a substituent represented by the following General Formula I,

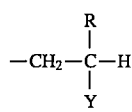

in which R is a hydrogen atom or methyl group, Y is

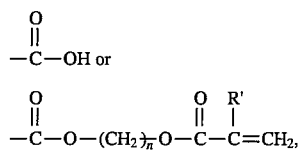

R' is a hydrogen atom or methyl group, and n is an integer of 2 to 4, which process comprises polymerizing propylene or random-copolymerizing ethylene and propylene in the presence of a catalyst consisting essentially of an organoaluminum compound and a vanadium compound represented by the following General Formula III,

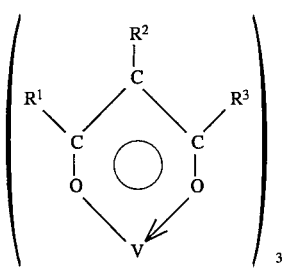

wherein $R^1$ to $R^3$ are hydrogen atoms or hydrocarbon groups of 1 to 8 carbon atoms and at least one of $R^1$ to $R^3$ must be a hydrogen atom, but all of $R^1$ to $R^3$ must not be hydrogen atoms, thus obtaining respectively living linear polypropylene or living linear ethylene-propylene random-copolymer, and then reacting the living polypropylene or ethylene-propylene random-copolymer with a methacrylic acid derivative or acrylic acid derivative represented by the following General Formula IV,

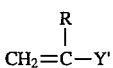

wherein R has the same meaning as described above, Y' is

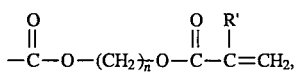

and R' and n have the same meanings as described above.

2. A process for the production of a terminal-modified linear chain polyolefin in which the polyolefin is polypropylene or ethylene-propylene random copolymer, one of the terminals of the polyolefin has a substituent represented by the following General Formula I,

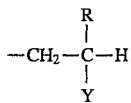

in which R is a hydrogen atom or methyl group, Y is

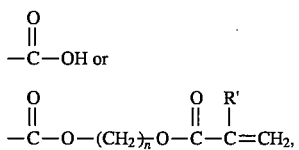

R' is a hydrogen atom or methyl group, and n is an integer of 2 to 4, which process comprises polymerizing propylene or random-copolymerizing ethylene and propylene in the presence of a catalyst consisting essentially of an organoaluminum compound and a vanadium compound represented by the following General Formula III,

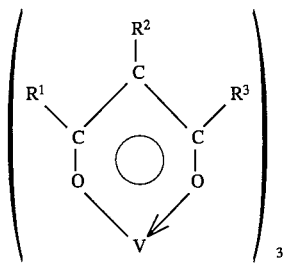

wherein $R^1$ to $R^3$ are hydrogen atoms or hydrocarbon groups of 1 to 8 carbon atoms and at least one of $R^1$ to $R^3$ must be a hydrogen atom, but all of $R^1$ to $R^3$ must not be hydrogen atoms, thus obtaining respectively living linear polypropylene or living linear ethylene-propylene random-copolymer, and then reacting the living polypropylene or ethylene-propylene random-copolymer with a methacrylic acid derivative or acrylic acid derivative represented by the following General Formula IV, $$CH_2=\overset{R}{\underset{|}{C}}-Y' \qquad \text{IV}$$

wherein R has the same meaning as described above, and Y' is $$-\overset{O}{\underset{\|}{C}}-Cl,$$

and reacting the reaction product with an aqueous solution of NaOH to synthesize a terminal-modified polyolefin having sodium (meth)acrylate at the terminal thereof, and contacting the terminal of sodium (meth)acrylate with a proton donor.

3. The process as claimed in claim 1, wherein the vanadium compound is a member selected from the group consisting of V(acetylacetonato)$_3$, V(2-methyl-1,3-butanedionato)$_3$ and V(1,3-butanedionato)$_3$.

* * * * *